(12) United States Patent
Eckert et al.

(10) Patent No.: US 6,460,878 B2
(45) Date of Patent: Oct. 8, 2002

(54) AIRBAG MODULE AND AIRBAG ARRANGEMENT AND METHOD THEREOF

(75) Inventors: Nick Eckert; Carsten Haase, both of Berlin; Martin Kamm, Niefern-Öschelbronn; Claude Rion, Ingolstadt; Udo Spies, Gaimershaim; Martin Neff, Ingolstadt, all of (DE)

(73) Assignee: Takata-Petri AG, Aschaffenburg (DE)

(*) Notice: Subject to any disclaimer, the term of this patent is extended or adjusted under 35 U.S.C. 154(b) by 0 days.

(21) Appl. No.: 09/896,106

(22) Filed: Jul. 2, 2001

(65) Prior Publication Data
US 2002/0024200 A1 Feb. 28, 2002

Related U.S. Application Data

(63) Continuation of application No. PCT/DE99/04101, filed on Dec. 17, 1999.

(30) Foreign Application Priority Data

Dec. 30, 1998 (DE) .......................... 198 60 933

(51) Int. Cl.$^7$ ................................ B60R 21/22
(52) U.S. Cl. .................. 280/730.1; 280/743.1; 280/743.2
(58) Field of Search ................... 280/730.1, 743.1, 280/743.2, 729, 740

(56) References Cited

U.S. PATENT DOCUMENTS

| | | | |
|---|---|---|---|
| 2,806,737 A | 9/1957 | Maxwell | |
| 2,834,606 A | 5/1958 | Bertrand | |
| 3,897,961 A | 8/1975 | Leising et al. | |
| 4,169,613 A | 10/1979 | Barnett | |
| 5,172,933 A | * 12/1992 | Strasser | 280/732 |
| 5,584,508 A | * 12/1996 | Maruyama et al. | 280/732 |
| 5,602,734 A | 2/1997 | Kithil | |
| 5,615,909 A | * 4/1997 | Wipasuramonton et al. | 280/730.2 |
| 5,722,685 A | * 3/1998 | Eyrainer | 280/729 |
| 5,772,238 A | 6/1998 | Breed et al. | |
| 5,992,877 A | * 11/1999 | Gray | 280/730.1 |
| 6,073,960 A | * 6/2000 | Viano et al. | 280/730.1 |
| 6,196,575 B1 | * 3/2001 | Ellerbrok et al. | 280/729 |
| 6,279,944 B1 | * 8/2001 | Wipasuramonton et al. | 280/729 |
| 2001/0040364 A1 | * 11/2001 | Viano et al. | 280/730.1 |

FOREIGN PATENT DOCUMENTS

| | | |
|---|---|---|
| DE | 198 60 827 A1 * | 7/2000 |
| DE | 100 19 894 A1 * | 10/2001 |
| GB | 2 345 669 A * | 7/2000 |
| JP | 63064851 | 9/1986 |

* cited by examiner

Primary Examiner—Paul N. Dickson
Assistant Examiner—Ruth Ilan
(74) Attorney, Agent, or Firm—Foley & Lardner

(57) ABSTRACT

An airbag arrangement and method includes an airbag module, which has a module housing and an airbag. The airbag is arranged so that it sequentially unfolds so that it ultimately becomes positioned in front of the passenger. The module is mounted along a roof region of the vehicle, in front of a passenger seat, with an opening of the housing facing toward the windshield. The airbag has a first section and a second section extending from the first section at an angle, which can be substantially at 90°. The first and second sections are configured to deploy substantially downwardly along the windshield. The second section is configured to further deploy toward the passenger, below the passenger's head level.

31 Claims, 7 Drawing Sheets

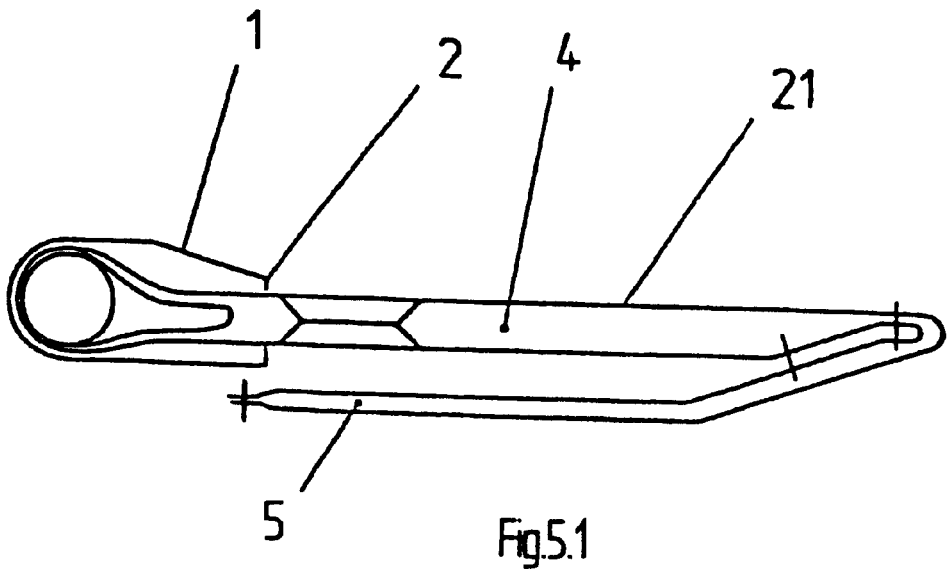
Fig.5.1
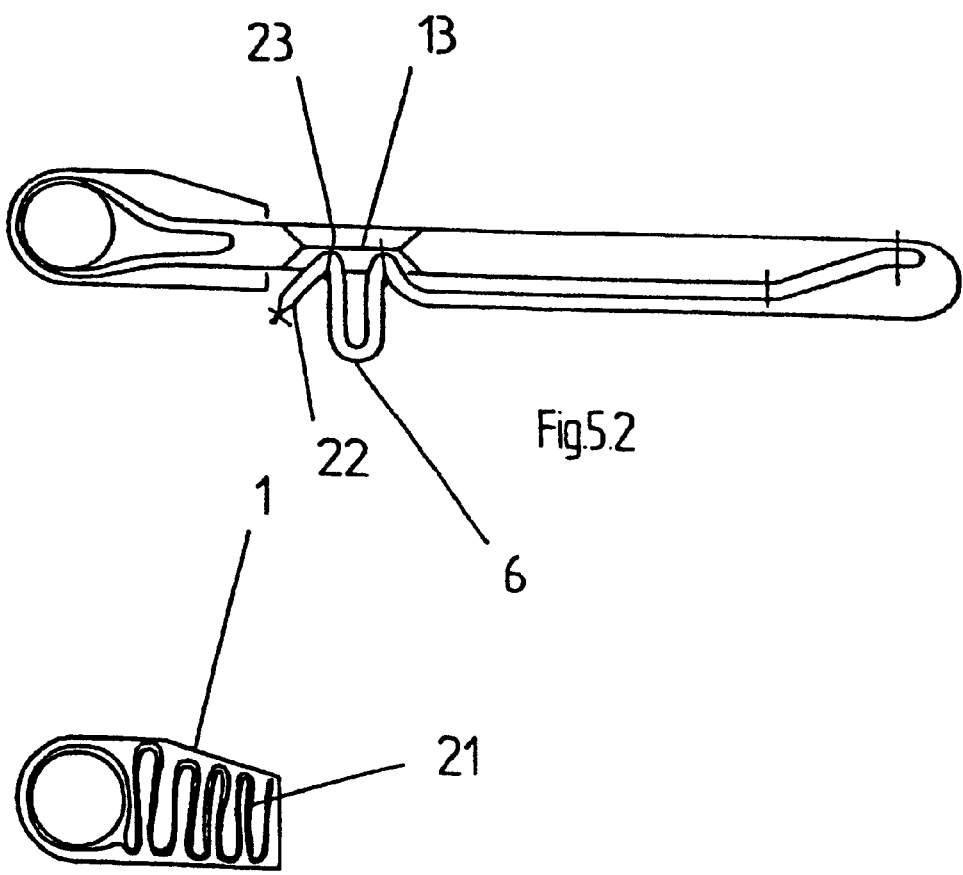
Fig.5.2
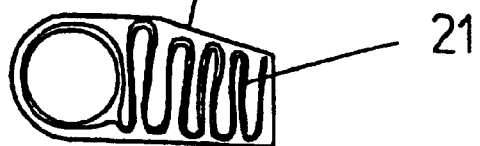
Fig.5.3

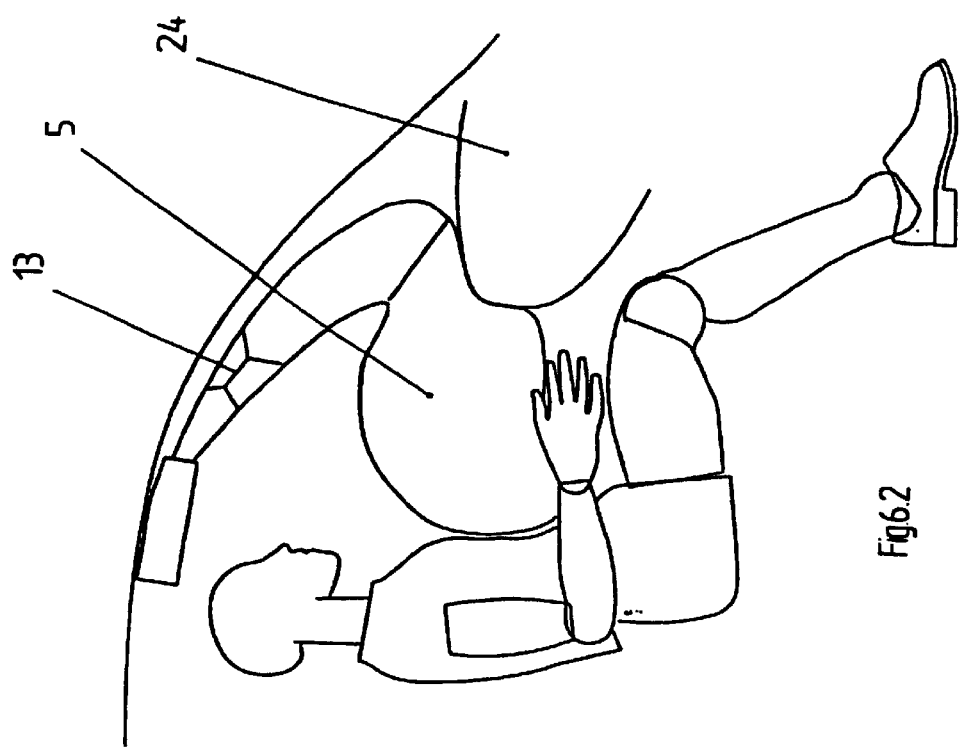
Fig 6.2
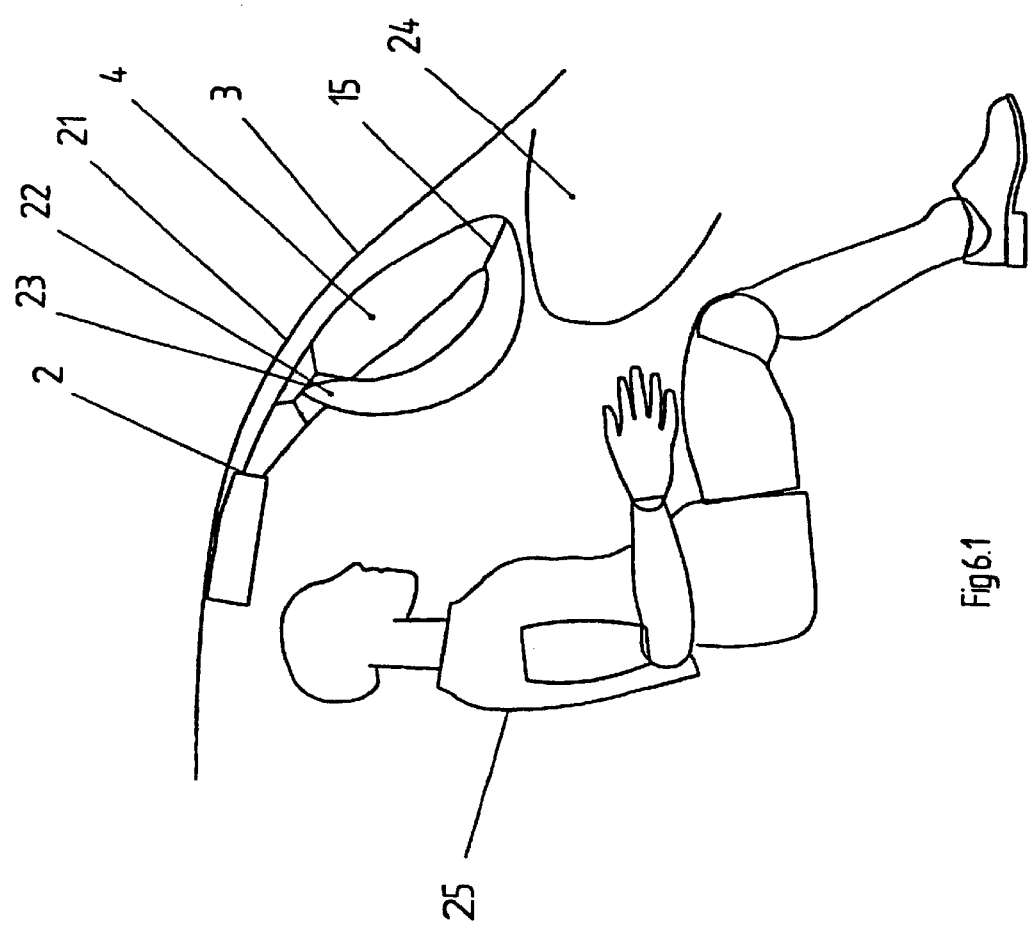
Fig 6.1

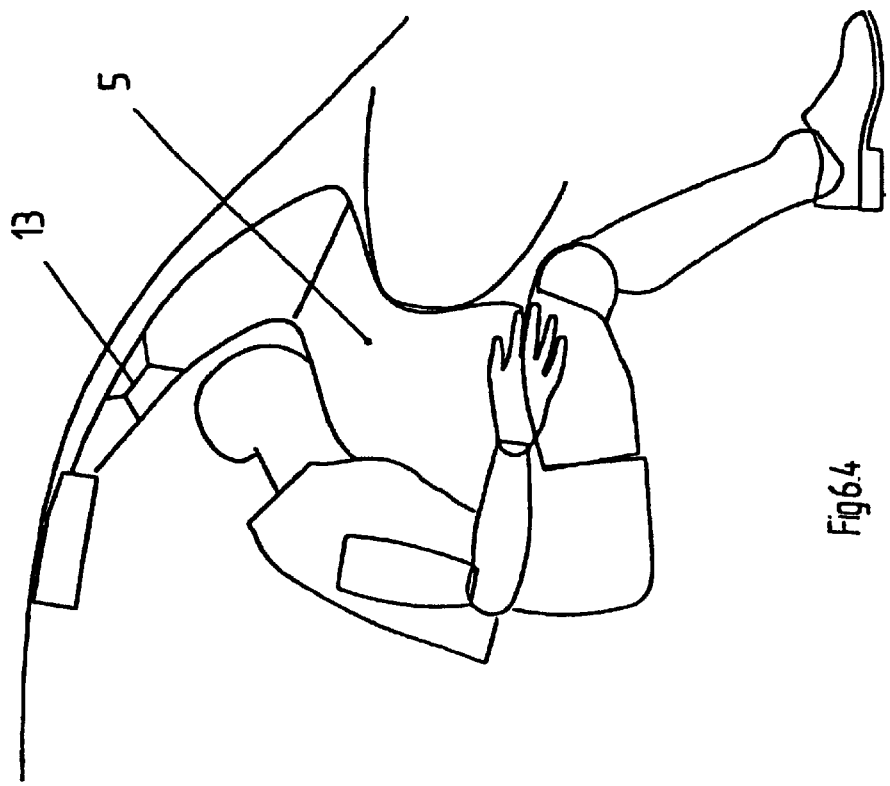
Fig 6.4
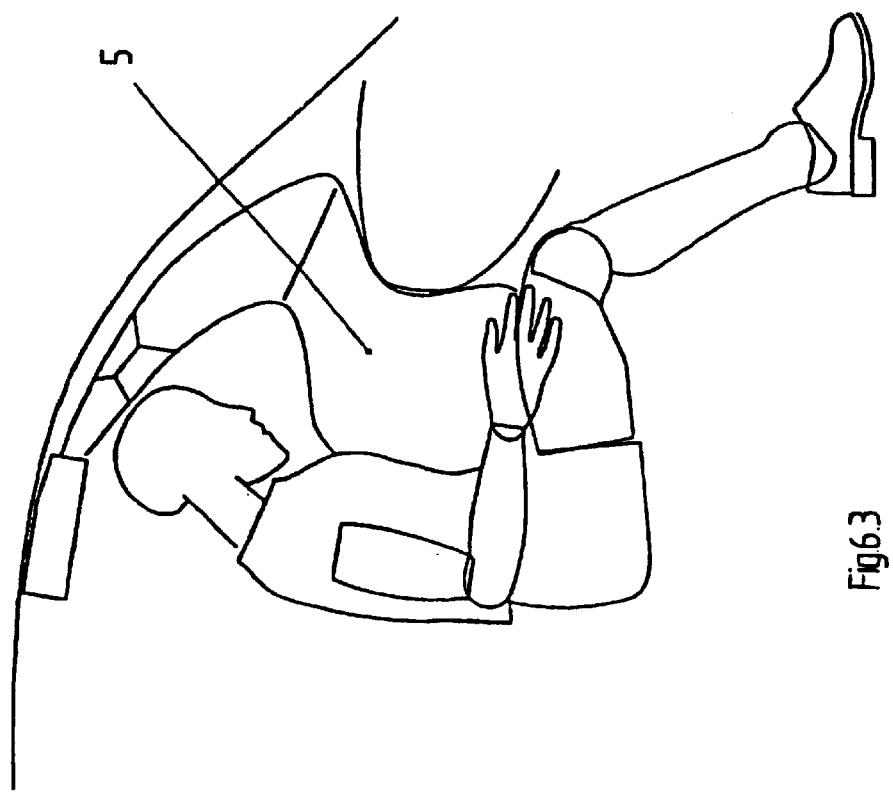
Fig 6.3

AIRBAG MODULE AND AIRBAG ARRANGEMENT AND METHOD THEREOF

This is a continuation of International Application PCT/DE99/04101, with an international filing date of Dec. 17, 1999; this international application was not published in English, but in German, as WO 00/40440.

BACKGROUND

An airbag module is typically positioned symmetrically in front of a passenger, i.e., symmetrically with the passenger's central bodyline, for protecting the passenger against a frontal impact. For protecting the driver, an airbag module is thus placed in the steering wheel, and for protecting the front passenger, another airbag module is placed in the dashboard. The front passenger's airbag module, however, takes up valuable space, which can be otherwise usable for placing other instrument panels or other uses, such as a larger front compartment. Accordingly, it is desirable to place the front passenger airbag module at another location.

U.S. Pat. No. 5,602,734 discloses a front-passenger airbag module arranged in the roof region, in front of the passenger. The airbag is designed so that it substantially simultaneously deploys from the top downward on the windscreen and in the direction of the passenger. In this case, the airbag can only protect the head and neck regions of the passenger during a frontal collision. In this regard, the entire space available in front of the passenger for cushioning the impact is not used. Furthermore, the expanding airbag can strike the passenger's head when the passenger sits too far forward. This blow can injure the passenger.

Accordingly, there is a need for an airbag module that avoids this problem. The present invention addresses this need.

SUMMARY OF THE INVENTION

The present invention relates to an airbag module designed to deploy its protecting airbag component from the front of the passenger. One aspect of the present invention relates to an airbag module, another to an airbag arrangement, and yet another to a method of deploying an airbag in a vehicle.

The airbag arrangement and the method can include the airbag module according to the present invention. In this respect, the airbag module is for mounting in a roof region of the vehicle, in front of the passenger. The module can include a module housing, an airbag, and a gas generator for supplying gas to the airbag to deploy the same. The housing has an opening that can face the vehicle windshield. The airbag is connected to and arranged inside the housing. The airbag has a first section and a second section extending from and angled relative to the first section. The second section can be configured to extend from the first section substantially at an angle of 90° when the airbag is deployed.

The first and second sections are configured to deploy substantially downwardly along the windshield. The second section is configured to deploy toward the passenger, below the passenger's head.

The first section, when deployed, has a smaller degree of expansion in the direction of the passenger than the second section. The first section is dimensioned to extend along the windshield and reach a dashboard of the vehicle, and the second section is dimensioned to cover at least the passenger's chest region.

The airbag can include a pocket and lateral overflow openings in the region where the airbag connects to the housing. The pocket can have a front edge that can extend transversely in the airbag relative to the passenger. The pocket can be connected to opposite sides of the airbag. The airbag can include a recessed portion adjacent to the front edge of the pocket. The recessed portion can be positioned opposite the passenger's head when the airbag is deployed.

The airbag can comprise a first panel and a second panel. The first panel of the first section, when the airbag is deployed, can face the passenger, and the pocket can be connected to the first and second panels. The airbag can also include at least one deflecting band fastened to the second panel at the transition between the first and second sections for angling the second section relative to the first section. The recessed portion can be substantially circular. The band can be centrally positioned in the airbag. The airbag can further include a tear seam securing an end of the second section to the first section. The end of the second section can be secured to the recessed portion.

The housing of the airbag module can be dimensioned substantially to the size of the gas generator, which can be tubular and arranged transversely relative to the passenger.

The airbag arrangement can include the above described airbag module mounted along the roof region of the vehicle, in front of the passenger seat, with the housing opening facing toward the windshield. Again, the first and second sections are configured to deploy substantially downwardly along the windshield, and the second section is configured to deploy toward the passenger, below the passenger's head level. The housing can be positioned in a region of the passenger-side sun visor.

The method of deploying an airbag in the vehicle can comprise mounting the airbag module along the roof region, in front of the passenger seat, with the housing opening facing toward the vehicle windshield, deploying the first and second sections substantially downwardly along the windshield, and further deploying the second section so that the second section inflates toward the seat, below the passenger's head level.

Another aspect of the method can include deploying the first and second sections above the front-passenger side substantially downwardly along the windshield, and further deploying the second section so that the second section inflates toward the front-passenger seat, below the passenger's head level.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

FIGS. 5.1 to 5.3 show the sequence of folding the airbag.

FIGS. 6.1 to 6.4 show the sequence of the expanding airbag during its deployment.

DETAILED DESCRIPTION

Figure 1:
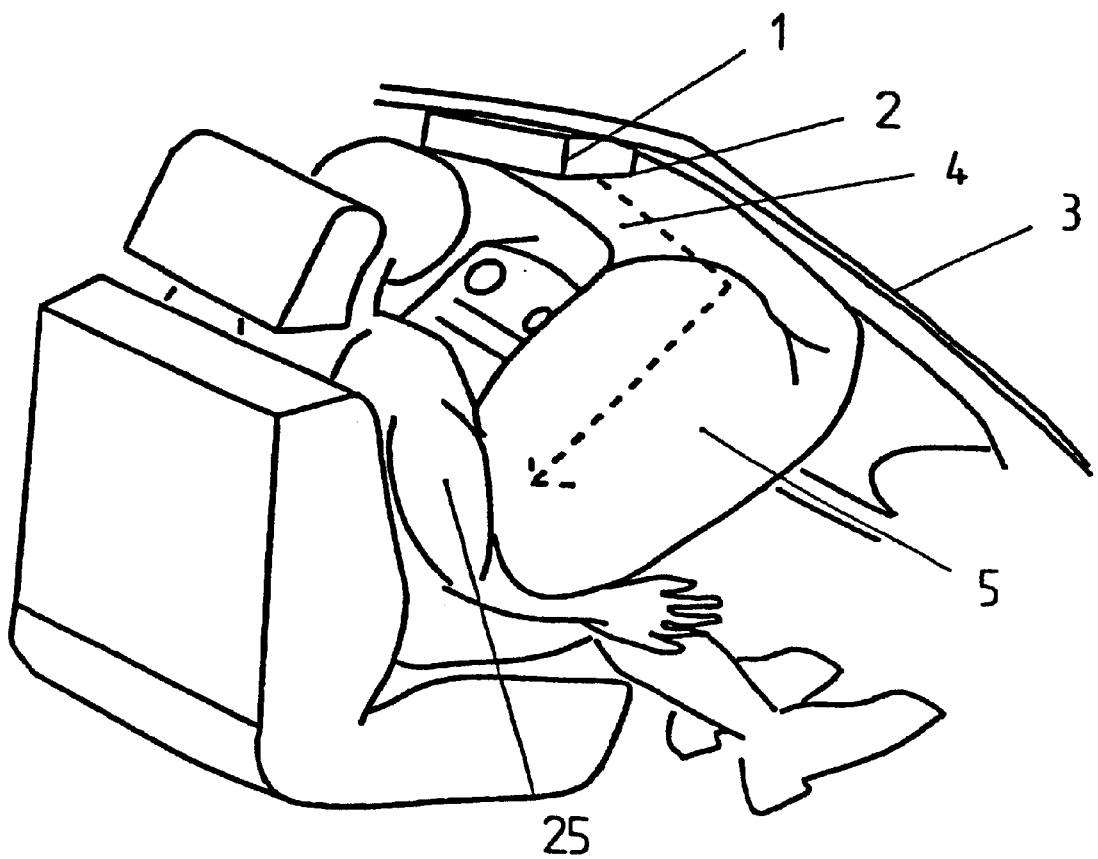
FIG. 1 shows the installation position of the airbag module and the deployment trajectory of the airbag according to the present invention.

Referring to FIG. 1, an airbag module for a front passenger is housed in a housing 1, which can be accommodated in the region of the sun visor. The housing 1 has an opening 2, through which its airbag 21 can exit toward the windshield 3. The arrow in FIG. 1 shows the deployment trajectory. The airbag has a first section 4 that deploys substantially downwardly along the windshield and a second section 5 extending from the first section 4 that subsequently deploys rearwardly, i.e., toward the passenger 25. The first section 4, when deployed, has a smaller degree of expansion in the direction of the passenger than the second section 5.

Figure 2:
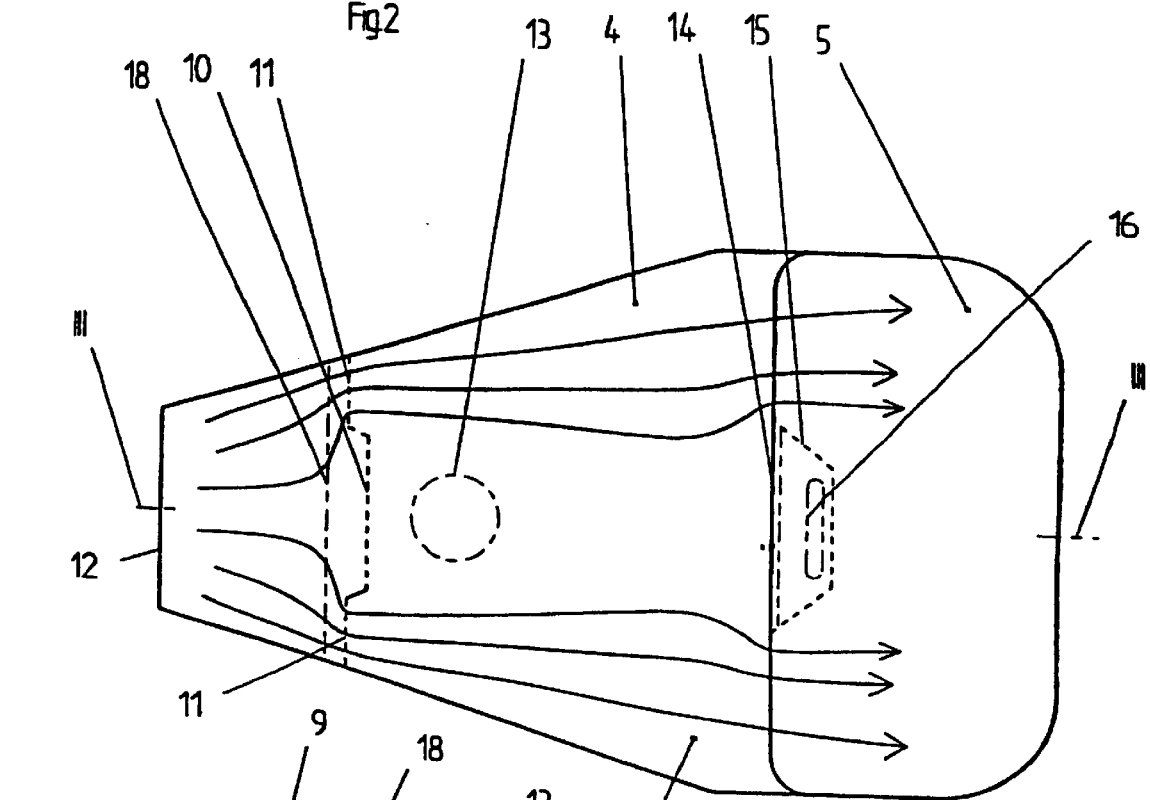
FIG. 2 shows a plan view of the airbag in a spread-out condition.
Figure 3:
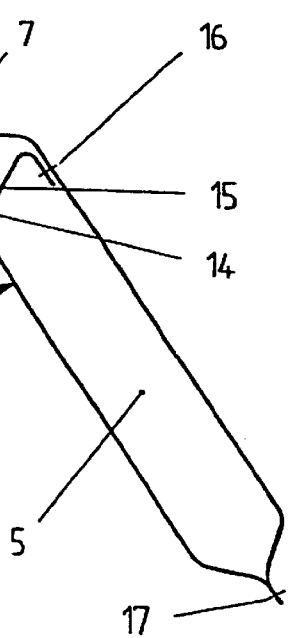
FIG. 3 is a sectional view taken along line III—III of FIG. 2.
Figure 4:
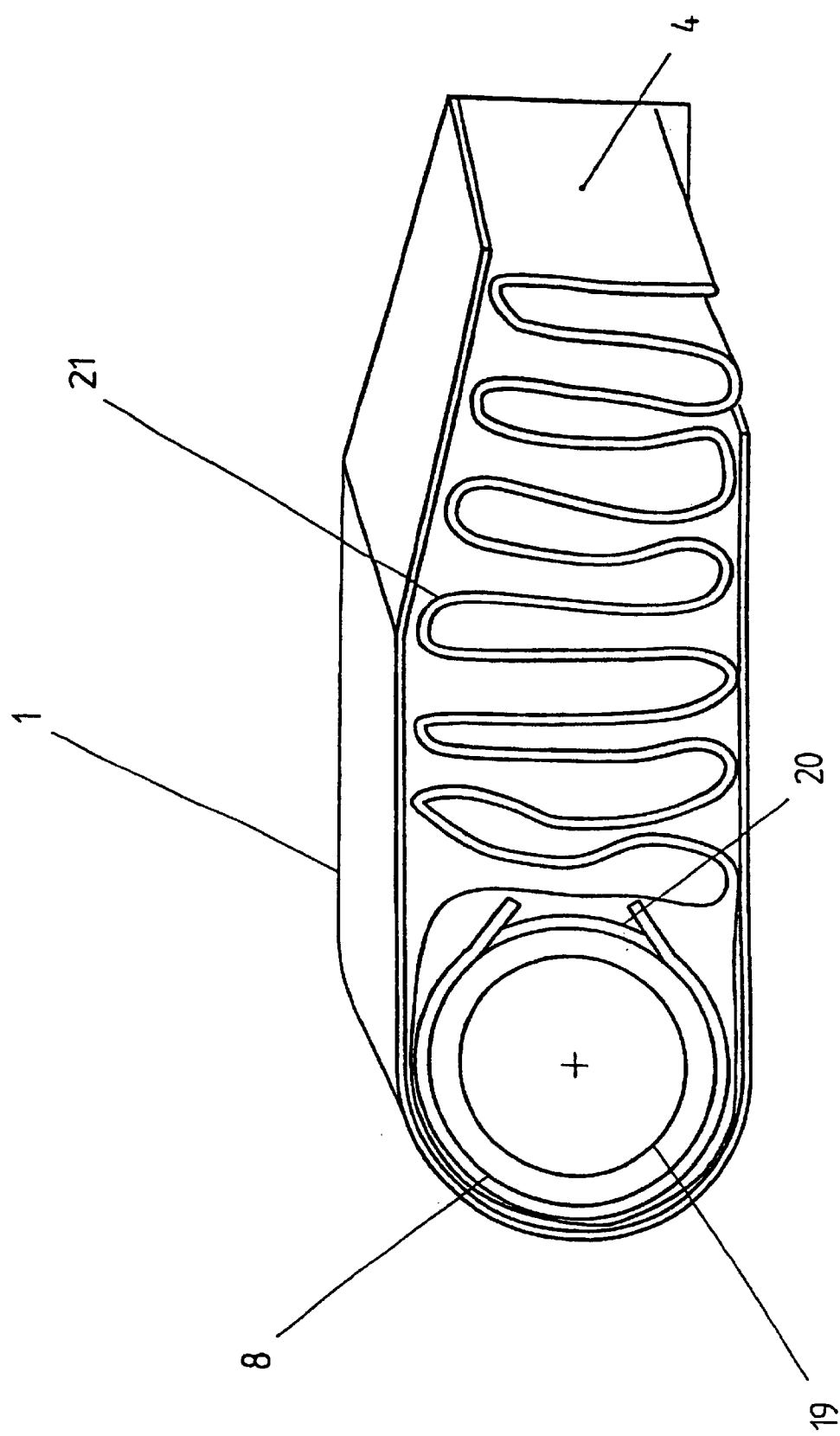
FIG. 4 illustrates a cross-sectional view of the airbag module.

FIGS. 2 and 3 illustrate the basic construction of the airbag. The illustrated airbag includes lower and upper panels 6, 7 sewn together at their periphery to form a seam 17. The airbag is connected at an open side 12 to a diffuser 8 (FIG. 4). The airbag further includes a pocket 9 adjacent to the diffuser 8. The front edge 10 of the pocket 9 runs transversely with respect to the passenger and has lateral overflow openings 11. Provided behind the pocket 9, in the direction of flow of the gases emerging from the gas generator, is a recessed portion 13 formed by connecting the upper and lower panels 6, 7 together. The recessed portion 13 can be formed with a circular seam. The pocket 9 is intended to restrict the degree of airbag expansion in the direction of the passenger, by connecting the upper and lower panels with seams 18. It has a catch band function, and it protects the recessed portion 13 from the aggressive gas jet. The recessed portion 13 functions to prevent the airbag from expanding toward the passenger at the upper portion of the first section 4 (to allow the passenger's head to clear the airbag when the passenger's head moves forward and downwardly, to avoid straining the passenger's neck.

Gathering and sewing together the lower panel 6 with a seam 14 along the entire width of the airbag forms a deflecting band 15, which is firmly sewn to the upper panel 7 on the inside with a seam 16. Thus, the airbag is divided into the two sections 4, 5, which are angled (by a X°) to each other. Referring to FIG. 2, the deflecting band 15 is provided only in the center region of the airbag so that the gas flows laterally past the deflecting band 1 5 into the second section 5 of the airbag. To improve flow, the lateral regions of the deflecting band can be tapered, as illustrated in FIG. 2.

FIG. 4 illustrates the airbag module, with its airbag folded and positioned inside its housing 1. The diffuser 8 surrounds a tubular gas generator 19, which is arranged in the housing 1 transversely with respect to the passenger. The diffuser 8 has an opening 20 in the direction of the passenger. The airbag 21, which is fastened to the diffuser, lies in front of the diffuser 8 in the folded position.

After the airbag 21 is spread out, the second section 5 is folded underneath the first section 4, as illustrated in FIG. 5.1. The end of the airbag is then partially gathered, as illustrated in FIG. 5.2, and the end portion or the end 22 of the second section 5 is fastened to the recessed portion 13 with a tear seam 23. The airbag is subsequently pushed into the housing 1 so that it forms a serpentine fold, as illustrated in FIGS. 4 and 5.3.

The deployment process can be seen from FIGS. 6.1 to 6.4. After activating the gas generator 19, the airbag 21 emerges from the opening 2, in which case, the first section 4 expands substantially downwardly along the windshield 3 to the dashboard 24. This propels the second section 5 so that it is place on the dashboard. In this deployment phase, the end 22 remains fastened to the recessed portion 13 (FIG. 6.1). It can be seen that, in this deployment phase, the airbag 21 is only slightly expanded toward the passenger 25. This prevents the passenger sitting too close toward the dashboard striking his or her head against the airbag in the deployment phase.

After the first section 4 deploys, in the next phase, the tear seam 23 tears at the recessed portion 13 when the second section 5 inflates to allow the second section 5 to deflect to an angle of approximately 90° relative to the first section 4. The second section 5 expands toward the chest of the passenger 25 and fills the space between the passenger and the dashboard 24 (see FIG. 6.2). It can be seen that the second section 5 of the airbag completely fills this space. If the passenger now moves forward, the second section 5 fully supports the passenger's chest, as can be seen from FIG. 6.3. The upper part of the passenger's body tilts forward, and the passenger's head plunges past the recessed portion 13, into the rear part of the second section 5, as illustrated in FIG. 6.4.

Figure 7A:
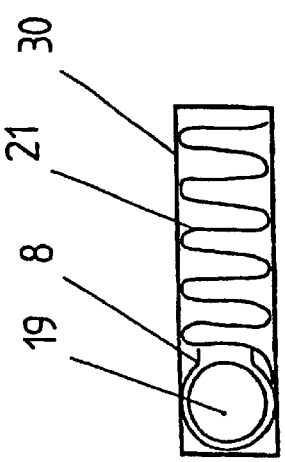
FIGS. 7a to 9b show various embodiments of the airbag module according to the present invention.
Figure 7B:
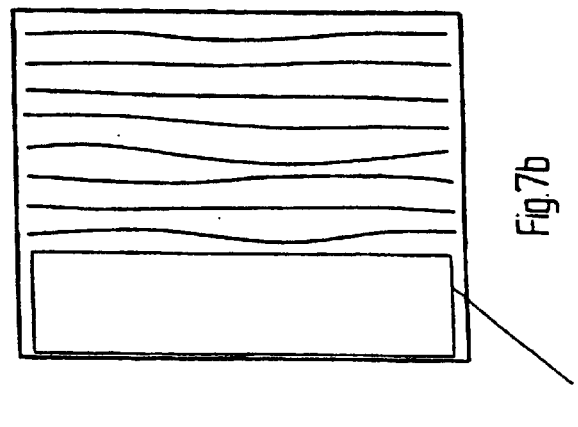

FIGS. 7a to 9b illustrate various embodiments of the airbag module. FIGS. 7a and 7b illustrate an airbag module having a rectangular housing 30 with the tubular gas generator 19 arranged together with the diffuser 8, and the folded airbag 21 arranged in the housing 30.

Figure 8A:
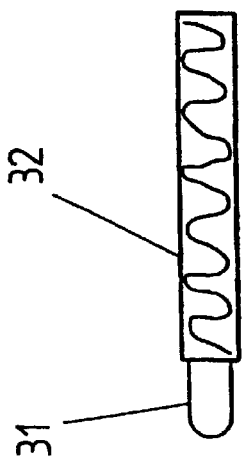
Figure 8B:
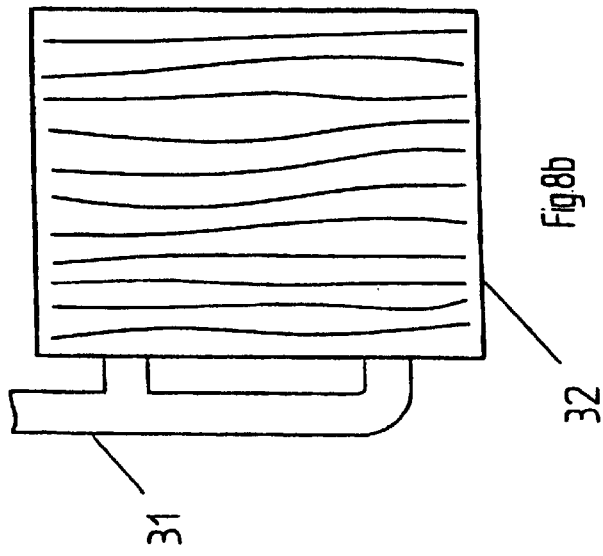

FIGS. 8a and 8b illustrate an airbag module with an external gas source (not illustrated). This gas source is connecting to the housing 32 of the airbag module via a pipeline 31.

Figure 9A:
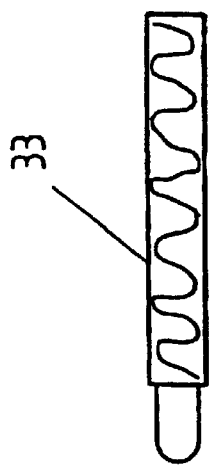
Figure 9B:
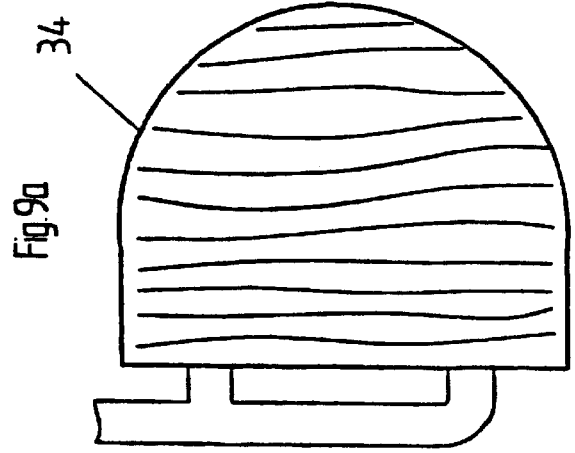

The embodiment of FIGS. 9a and 9b essentially corresponds to the embodiment of FIGS. 8a and 8b. The difference is that its housing 33 has a rounded edge 34. at a portion where the airbag emerges from the housing 33.

The airbag arrangement according to the present invention can substantially fill the space in front of the passenger. Moreover, the present airbag arrangement not only frees up the space (below the dashboard) previously unavailable for other internal components or uses, it provides improved protection, particularly for a passenger sitting close to the dashboard. Moreover, the airbag deploys from the position above the passenger into a position in front of the passenger, without the risk of the airbag striking the passenger, even if the passenger sits too closely toward the dashboard.

The advantage of the present arrangement resides in that, during deployment of the airbag, the passenger's head does not come into contact with the first section because it only expands very little toward the passenger.. The passenger's head also does not contact the second section during its deployment, since this section is directed toward the body, below the head. Even for a passenger seated far forward, the second part fully supports the chest during a collision. During a collision, the upper part of the passenger's body tilts forward. Only then, when the deployment process has ended, does the passenger's head plunge into the second section.

As flame protection for the pocket and the connecting points, a second pocket can be arranged in the interior of the airbag.

The disclosure of the parent application, PCT/DE99/04101, and its priority application, DE 198 60 933.7, in their entirety, including the drawings, claims, and the specification thereof, is incorporated herein by reference.

We claim:

1. An airbag module for mounting in a roof region of a vehicle, in front of a passenger seat, comprising:
   a module housing having an opening adapted to face a windshield of the vehicle;
   an airbag connected to and arranged inside the housing, the airbag having a first section and a second section extending from and angled relative to the first section; and a gas generator for supplying gas to the airbag, wherein the first section is configured to deploy substantially downwardly along the windshield, and wherein the second section is configured to deploy from a lower end of the first section proximate a lower end of the windshield toward the passenger seat.

2. An airbag module according to claim 1, wherein the first section, when deployed, has a smaller degree of expansion in the direction of the passenger seat than the second section.

3. An airbag module according to claim 1, wherein the first section is dimensioned to extend along the windshield and reach a dashboard of the vehicle, and the second section is dimensioned to extend from the first section at a location proximate the dashboard toward the passenger seat.

4. An airbag module according to claim 1, wherein the second section is configured to extend from the first section substantially at an angle of 90° when the airbag is deployed.

5. An airbag module according to claim 1, wherein the airbag includes a pocket and lateral overflow openings in the region where the airbag connects to the housing, the pocket having a front edge adapted to extend transversely in the airbag with respect to the passenger seat, and the pocket being connected to opposite sides of the airbag.

6. An airbag module according to claim 5, wherein the airbag further includes a recessed portion adjacent to the front edge of the pocket, the recessed portion being adapted to be positioned opposite the passenger's head when the airbag is deployed.

7. An airbag module according to claim 5, wherein the airbag comprises a first panel and a second panel, the first panel of the first section, when the airbag is deployed, being adapted to face the passenger, and the pocket being connected to the first and second panels.

8. An airbag module according to claim 7, wherein the airbag further includes a deflecting band fastened to the second panel at the transition between the first and second sections for angling the second section relative to the first section.

9. An airbag module according to claim 6, wherein the recessed portion is substantially circular.

10. An airbag module according claim 4, wherein the airbag further includes at least one deflecting band at an intersection of the first and second sections for angling the second section relative to the first section.

11. An airbag module according to claim 10, wherein the deflecting band is centrally positioned in the airbag.

12. An airbag module according to claim 6, wherein the airbag further includes a tear seam securing an end of the second section to the first section.

13. An airbag module according to claim 12, wherein the end of the second section is secured to the recessed portion.

14. An airbag module according to claim 1, wherein the housing of the airbag module is dimensioned substantially to the size of the gas generator, which is tubular and adopted to be arranged transversely relatively to the passenger.

15. An airbag arrangement for a vehicle, comprising:
an airbag module mounted along a roof region of the vehicle, in front of a passenger seat, the airbag module having a module housing, an airbag, and a gas generator for supplying gas to the airbag, wherein the housing has an opening facing toward a windshield of the vehicle, wherein the airbag is connected to and arranged inside the housing when the airbag is not deployed, the airbag having a first section and a second section extending from the first section at an angle, wherein the first and second sections are configured to deploy substantially downwardly along the windshield, and wherein the second section is configured to deploy toward the passenger from a lower end of the first section.

16. An airbag arrangement according to claim 15, wherein the housing is positioned in a region of a passenger-side sun visor of the vehicle.

17. An airbag arrangement according to claim 15, wherein the first section, when deployed, has a smaller degree of expansion in the direction of the passenger seat than the second section.

18. An airbag arrangement according to claim 15, wherein the first section is dimensioned to extend along the windshield and reach a dashboard of the vehicle, and the second section is dimensioned to extend toward the passenger seat.

19. An airbag arrangement according to claim 15, wherein the second section is configured to extend from the first section substantially at an angle of 90° when the airbag is deployed.

20. An airbag arrangement according to claim 15, wherein the airbag includes a pocket and lateral overflow openings in the region where the airbag connects to the housing, the pocket having a front edge extending transversely in the airbag relative to the seat, and the pocket being connected to opposite sides of the airbag.

21. An airbag arrangement according to claim 20, wherein the airbag further includes a recessed portion adjacent to the front edge of the pocket, the recessed portion being positioned opposite the passenger's head when the airbag is deployed.

22. An airbag arrangement according to claim 20, wherein the airbag comprises a first panel and a second panel, the first panel of the first section, when the airbag is deployed, faces the seat, and the pocket is connected to the first and second panels.

23. An airbag arrangement according to claim 22, wherein the airbag further includes a deflecting band fastened to the second panel at the transition between the first and second sections for angling the second section relative to the first section.

24. An airbag arrangement according to claim 21, wherein the recessed portion is substantially circular.

25. An airbag arrangement according claim 19, wherein the airbag further includes at least one deflection band at an intersection of the first and second sections for angling the second section relative to the first section.

26. An airbag arrangement according to claim 25, wherein the deflecting band is centrally positioned in the airbag.

27. An airbag arrangement according to claim 19, wherein the airbag further includes a tear seam securing an end of the second section to the first section.

28. An airbag arrangement according to claim 21, wherein the end of the second section is secured to the recessed portion.

29. An airbag arrangement according to claim 15, wherein the housing of the airbag module is dimensioned substantially to the size of the gas generator, which is tubular and arranged transversely relative to the seat.

30. A method of deploying an airbag in a vehicle, comprising the steps of:
providing an airbag module having a module housing, an airbag, and a gas generator for supplying gas to the airbag, wherein the airbag is connected to and arranged inside the housing when the airbag is not deployed, the airbag having a first section and a second section extending from the first section at an angle, and wherein the housing has an opening;

mounting the airbag module along a roof region of the vehicle, in front of a passenger seat, with the housing opening facing toward a windshield of the vehicle;

deploying the first section substantially downwardly along the windshield; and further deploying the second section so that the second section inflates toward the seat from a lower end of the first section.

31. A method of inflating an airbag in a vehicle, comprising the steps of:

providing an airbag having a first section and a second section extending from the first section at an angle;

deploying the first section from above a front-passenger side, substantially downwardly along a windshield of the vehicle, toward a vehicle dashboard; and further deploying the second section so that the second section inflates toward a front-passenger seat from a lower end of the first section proximate the dashboard.

* * * * *